United States Patent
Stein et al.

(10) Patent No.: US 8,981,256 B2
(45) Date of Patent: Mar. 17, 2015

(54) APPARATUS FOR JOINING TWO WORKPIECE PARTS ALONG A WELD BY MEANS OF TRANSMISSION WELDING

(71) Applicant: JENOPTIK Automatisierungstechnik GmbH, Jena (DE)

(72) Inventors: Helmut Stein, Hof (DE); Werner Wollmann, Jena (DE); Norbert Krzyzaniak, Erfurt (DE); Gerd Haehnel, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 313 days.

(21) Appl. No.: 13/671,772

(22) Filed: Nov. 8, 2012

(65) Prior Publication Data
US 2014/0124487 A1 May 8, 2014

(30) Foreign Application Priority Data
Nov. 10, 2011 (DE) .................. 10 2011 055 203

(51) Int. Cl.
| | |
|---|---|
| B29C 65/16 | (2006.01) |
| B23K 26/06 | (2014.01) |
| B23K 37/04 | (2006.01) |
| B23K 26/08 | (2014.01) |
| B23K 26/24 | (2014.01) |
| B23K 26/32 | (2014.01) |
| B23K 26/20 | (2014.01) |

(52) U.S. Cl.
CPC ............. *B23K 37/0452* (2013.01); *B23K 26/06* (2013.01); *B23K 26/328* (2013.01); *B23K 26/20* (2013.01); *B29C 65/16* (2013.01); *B23K 26/0608* (2013.01); *B23K 26/0838* (2013.01); *B23K 26/246* (2013.01)
USPC .................................. 219/121.63; 156/380.9

(58) Field of Classification Search
CPC ........ B29C 65/16; B23K 26/06; B23K 26/20; B23K 26/328
USPC ............... 219/121.63–121.66, 121.6, 121.85; 156/272.8, 379.6, 380.9; 264/482
See application file for complete search history.

(56) References Cited

U.S. PATENT DOCUMENTS

| | | | |
|---|---|---|---|
| 6,465,757 B1 | 10/2002 | Chen | |
| 7,211,166 B2 | 5/2007 | Chen et al | |
| 7,626,138 B2* | 12/2009 | Bovatsek et al. | 219/121.69 |
| 8,506,872 B2* | 8/2013 | Hokoda et al. | 264/482 |
| 2004/0154737 A1* | 8/2004 | Chen et al. | 156/272.8 |
| 2011/0108529 A1 | 5/2011 | Wollmann et al. | |

FOREIGN PATENT DOCUMENTS

| | | |
|---|---|---|
| DE | 100 07 391 A1 | 5/2001 |
| DE | 103 39 636 A1 | 3/2005 |

(Continued)

*Primary Examiner* — Samuel M Heinrich
(74) *Attorney, Agent, or Firm* — Duane Morris LLP

(57) ABSTRACT

Apparatus has a receptacle (1) for two workpiece parts (21, 22) which extend two-dimensionally in X and Y directions and which are to be joined along a weld. The apparatus includes a laser beam source (30) comprising a plurality of individually controllable laser beam emitters (31) which collectively form a line array which is oriented in X direction, a transporting device (6) for transporting the laser beam source (30) relative to the receptacle (1) in Y direction, and a homogenizer (50) arranged downstream of the laser beam source (30) in the radiating direction. The homogenizer (50) has a carrier (52) in which is provided at least one reflection channel (51) with a channel cross section (QS) which is adapted to the course of the weld and a channel width (b) which is adapted to the width of the weld.

10 Claims, 3 Drawing Sheets

(56) References Cited

FOREIGN PATENT DOCUMENTS

| DE | 10 2009 053 261 A1 | 5/2011 |
|---|---|---|
| DE | 10 2010 007 717 A1 | 8/2011 |
| EP | 0 997 261 B9 | 1/1999 |
| EP | 0 997 261 B1 | 5/2000 |
| EP | 1 405 713 B1 | 10/2002 |
| WO | WO 2005/023479 A1 | 3/2005 |

\* cited by examiner a)

b)

c)

d)

APPARATUS FOR JOINING TWO WORKPIECE PARTS ALONG A WELD BY MEANS OF TRANSMISSION WELDING

RELATED APPLICATIONS

The present application claims priority benefit of German Application No. DE 10 2011 055 203.0 filed on Nov. 10, 2011, the contents of which are incorporated by reference in its entirety.

BACKGROUND OF THE INVENTION

The invention is directed to an apparatus for joining workpiece parts, preferably workpiece parts extending over a large area, along a joint region (in this instance, at least two-dimensional weld) by means of transmission welding.

Generally, to carry out transmission welding two workpiece parts to be connected to one another are put together in such a way as to directly contact along a contact zone. The joint region lies within the contact zone. The first workpiece part is transmissive for the laser beams and faces a laser source. The second workpiece part is absorptive for the laser beams. The laser beams penetrate the first workpiece part, impinge on the upper layers of the second workpiece part, where they are absorbed and are converted into heat energy. The upper layers of the second workpiece part are fused which, due to heat conduction, also brings about a fusing of the adjoining layers of the first workpiece part and a bonding of both workpiece parts to form one workpiece.

If the two workpiece parts are to be joined to one another along a joint region that is not identical to the contact zone, the impingement of the laser beams on the joint region must be limited so that other areas within the contact zone are not also welded together.

One possibility for this consists in the use of a laser beam which is focused in a point or a line on the joint region as is described in patent document EP 1 405 713 B1. An optical lens which focuses the laser beam, is formed as a roller or ball and sits on the surface of the transmissive workpiece is moved along the joint region in synchronization with the laser beam. In so doing the workpiece parts to be welded are pressed together locally by the lens and joined to one another in a precise manner along the joint region. However, joining larger surfaces proves to be very time-consuming.

Patent document EP 997 261 B9 discloses another method by which two workpiece parts are joined to one another in a joint region by transmission welding. In so doing the exposed surface of a transmissive workpiece part is covered by a mask that is opaque to laser light, and laser beams impinge on the mask in the form of a laser curtain which is generated through collimation and focusing of laser beams of one or more laser sources. The mask is perforated in conformity to the joint region so that those areas of the contact zone which are not to be joined to one another are masked. The laser beams blocked by the mask are reflected.

The laser beams impinge on the surface of the absorbing workpiece part along a laser line, this laser line being divided into line segments by the configuration of the mask. If the mask is perforated in conformity to a line segment, the line segment is illuminated by the full power of the laser beams; if the mask is not perforated, the respective line segment is not illuminated. Workpiece parts and laser line are moved relative to one another so that the laser line is guided along the joint region. In so doing the laser line is constantly adapted to the position and extension of the joint region currently being swept over. The extension of the laser curtain and, therefore, the maximum extension of the laser line can be adjusted by changing the working distance between the laser source and mask. Further, the energy density of the laser line can be adapted by changing the output of the laser beams.

It is unfavorable in terms of energy efficiency that a portion of the emitted laser beams is not used and, further, is reflected in a more or less diffuse manner, which increases the thermal load on the apparatus and laser source and necessitates additional measures for protecting the operator. Further, no steps are provided for influencing the power density distribution of the laser beams on the workpiece surface.

An apparatus in which these disadvantages are overcome is disclosed by the Laid Open Application DE 100 07 391 A1. By means of the apparatus disclosed therein influence can be exerted on the power density distribution as well as on the shape of the focal point of a laser beam generated on the workpiece.

For this purpose, a planar, spatially resolving beam modulator for generating a predefinable power density distribution is arranged between laser beam source and workpiece. The spatial resolution achieved by the beam modulator is achieved through a matrix of individually controllable cells which is arranged in a plane, the cells being arranged perpendicular to this plane in the beam path of the laser beam source. Depending on the quantity of cells, a laser beam coming from the laser beam source is divided into individual constituent beams. The transmission of the corresponding constituent beam can be influenced by each of these mutually independent cells. By these means, in the region of the matrix the power density distribution can be selectively adjusted over the channel cross section of the entire laser beam before it strikes the workpiece.

For modulation of the constituent beams, the cells have either a movable micro-mirror or a micro-polarizer or are constructed as liquid crystal cells. With these devices, the transmission of every cell can be adjusted in a continuous manner from maximum transmission to complete blocking of the beam. This affords a wide range of possibilities for sequential or simultaneous working of materials. In an embodiment of the apparatus, for example, a simultaneous working of the workpiece on a surface defined by the beam modulator is carried out in that only those constituent beams required for working a contour arranged two-dimensionally on the workpiece are simultaneously released. The adjustment of a uniform power density distribution along the shape of the entire contour is carried out simultaneously through a gradation of the transmission of the individual enabled cells with respect to one another.

Since the beam modulator is arranged directly in the beam path, the materials used for constructing it must have the highest possible destruction threshold. In order that a laser beam which generally has irregularities in its beam profile that are already close to the destruction threshold at certain points can be prevented from impinging on the beam modulator and in order to increase the dynamic range of the beam modulator, additional steps are needed to homogenize the laser beam even before it impinges on the beam modulator. It can be assumed that the exacting demands imposed on the material properties and on the functional configuration of the beam modulator, the use of additional optics for homogenizing the laser beam striking the beam modulator, and the preparation of a required control represent a significant expenditure for production of the apparatus. Moreover, the principle employed for this purpose can only be meaningfully applied for working small workpieces.

In an apparatus disclosed in Laid Open Application DE 10 2010 007 717 A1, a substantially simpler possibility is described for joining two planar workpiece parts along a structured joint region extending over a large area by means of a line-shaped laser beam source comprising a plurality of individually controllable individual emitters without use of a mask.

The apparatus comprises a carrier (in this case, receptacle) which is designed so that two workpiece parts extending two-dimensionally in X and Y direction can be positioned relative to one another, a line array (in this case, laser beam source comprising a plurality of individually controllable individual emitters, preferably laser beam emitters, collectively forming a line array) which is directed to the receptacle and aligned in X direction, a device for transporting the line array relative to the receptacle in Y direction, and a control for spatially resolved operation of the individual emitters. According to an embodiment example, the line array comprises laser diodes which are arranged adjacent to one another in direction of their slow axis and whose laser beam is collimated in the fast axis direction by a cylindrical lens arranged upstream in the radiating direction corresponding to the Z direction.

The line array which completely spans the joint region in one extension direction generates a laser curtain which executes a relative movement with respect to the workpiece parts and in so doing sweeps over the entire joint region in the second extension direction thereof By means of selectively actuating the individual laser diodes during the relative movement, a corresponding laser power impinges exclusively on the joint region. Zones in which no joint is present are not affected by the laser power and therefore need not be masked.

In this way, it was possible to find a comparatively energy-efficient solution for welding larger workpieces. However, the laser beams impinge on the workpiece parts without being influenced so that the laser beams generally have an inhomogeneous power density distribution in the form of a Gaussian profile. Accordingly, it is impossible to generate sharply contoured joint regions with a homogeneous melt, e.g., in the form of narrow, tight welds. As a rule, a sharply defined joint region is demanded when the joint region is visible to the eye and has a determining influence on the appearance of a workpiece. A homogeneous melt is demanded when the workpiece parts must be joined to one another in a sealing manner.

SUMMARY OF THE INVENTION

It is the object of the invention to provide an apparatus for transmission welding preferably of workpiece parts extending over large areas by which a weld extending in at least two dimensions, particularly also a closed loop weld, with a sharp boundary and a homogeneous melt can be produced in a reproducible manner. Further, the apparatus should have a simple construction and make it possible to carry out the welding process quickly.

A simple apparatus of the type described, e.g., in Laid Open Application DE 10 2009 053 261 A1 for spot welding in which a homogenization of the impinging beam power is achieved by blending the laser beams through multiple reflection in a so-called beam pipe would be desirable. However, this apparatus is suitable exclusively for the welding of spot joints.

BRIEF DESCRIPTION OF THE DRAWINGS

The invention will be described more fully in the following with reference to embodiment examples. The accompanying drawings show.

DESCRIPTION OF THE EMBODIMENTS

Figure 1:
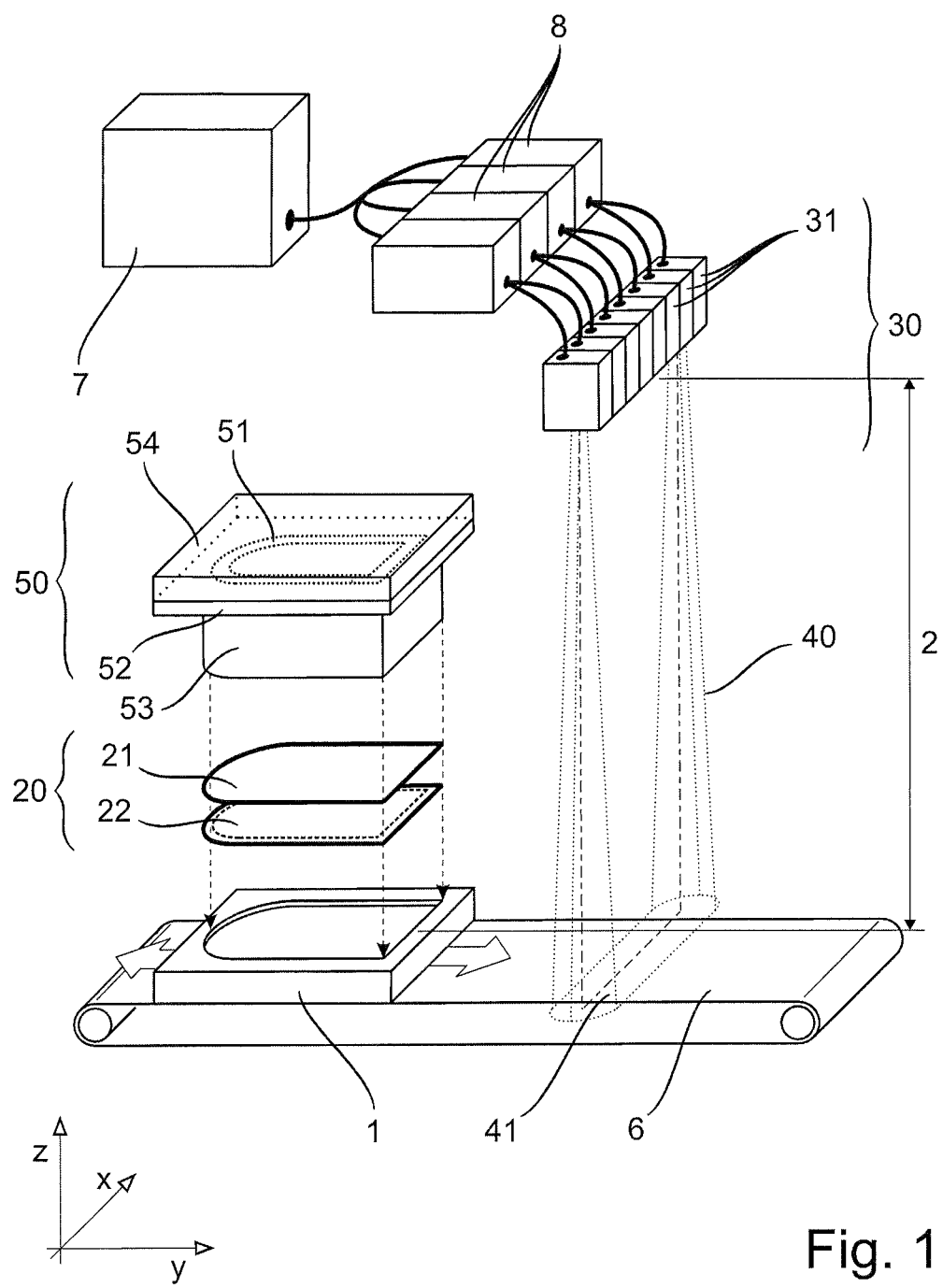
FIG. 1 an overview of the essential components of the apparatus.

According to a first embodiment example shown in FIG. 1, the apparatus substantially has a storage-and-control unit 7, a laser beam source 30, a homogenizer 50, a receptacle 1, and a transporting device 6.

The receptacle 1 is dimensioned in such a way that a workpiece 20 extending in a planar manner in X and Y direction is positionable therein in the X direction, Y direction and Z direction of a Cartesian coordinate system. The workpiece 20 comprises a transmissive workpiece part 21 and an absorptive workpiece part 22 and is positioned in the receptacle 1 in such a way that the transmissive workpiece part 21 faces the laser beam source 30. The non-transparent homogenizer 50 shielding the workpiece 20 from the effective region 41 of the laser beam source 30 is arranged between the laser beam source 30 and the receptacle 1. This homogenizer 50 has a carrier 52 in which is provided a reflection channel 51 which is continuous in Z direction. The reflection channel 51 has in the X and Y direction a channel cross section QS which is limited by channel wall surfaces 53 and which is shaped and arranged in conformity to the course of a weld seam to be welded. Further, it has a channel width b which is adapted to the weld width and a channel length l extending in Z direction. A transporting device 6 is provided for carrying out a relative movement between receptacle 1 and laser beam source 30 in Y direction.

The receptacle 1 shown in FIG. 1 is fixedly connected to the transporting device 6 for realizing the relative movement between laser beam source 30 and receptacle 1, and therefore also of the workpiece 20, in Y direction (movement direction). As concerns the production of a weld, according to the invention, it is immaterial whether it is laser source 30 and/or receptacle 1 that is moved.

Inserted into the receptacle 1 from above, the large-area workpiece parts 21 and 22 forming the workpiece 20 are positioned relative to one another and relative to the apparatus in X direction, Y direction and Z direction by position-securing means such as supports, stops, recesses or other positively engaging elements. The workpiece parts 21, 22 have a typical dimensioning of up to one meter in width in X direction and a length in Y direction limited only by the movement range of the transporting device 6.

The laser source 30 is arranged at a distance 2 from the receptacle 1 in Z direction over the receptacle 1. The laser source 30 comprises a plurality of individually controllable laser beam emitters 31, particularly high-power diode laser modules (hereinafter referred to as HLDL modules). The individual laser beam emitters 31 form a line array oriented in X direction and are operated by means of the storage-and-control unit 7 and the laser power supplies 8. The laser beams 40 radiating from the laser beam source 30 are directed to the workpiece 20 with their radiating direction in Z direction. Since no further beam-shaping optics are provided in the apparatus, the laser beams 40 exiting from the laser beam source 30 in the form of the line array have a divergence corresponding to the radiating angles of the laser beam emitters 31. The distance 2 between the laser beam source 30 and the workpiece 20 is adjusted in such a way that a partial overlapping of the laser beams 40 exiting from the individual laser beam emitters 31 is brought about in Z direction in the effective region 41 of the laser beams 40.

In case all of the individual laser beam emitters 31 are operated simultaneously, the laser beams 40 exiting from the line array have in sum the shape of a divergent laser curtain which presents a line-shaped effective region 41 with an intensity profile of a line-shaped Gaussian distribution in Z direction at the height of the receptacle 1. The divergence of the laser curtain corresponds to the sum of the divergences of the individual HLDL modules.

The individual HLDL modules are aligned with the line array of the laser beam source 30 in such a way that their slow axis extends in X direction and their fast axis extends in Y direction. The laser beam 40 is collimated in direction of the fast axis by means of cylindrical lenses to a divergence angle of approximately 0.5°. The laser beam 40 has a divergence angle of approximately 3.5° in the direction of the slow axis.

The homogenizer 50 arranged between the laser beam source 30 and the workpiece 20 comprises a carrier 52 which is dimensioned in X and Y direction in such a way that it can shield the workpiece 20 positioned in the receptacle 1 from the effective region 41 of the laser beams 40. In order to generate a weld, an annular reflection channel 51 is incorporated in the carrier 52, which reflection channel 51 is continuous in Z direction, has a channel length l and a channel width b, and through which the laser beams 40 can strike regions on the workpiece 20 which are exposed thereby. The position and the channel cross section QS of the reflection channel 51 in X and Y direction correspond to the position and shape of a weld to be produced on a workpiece 20 positioned in the receptacle 1.

The reflection channel 51 has in its channel cross section QS portions in which the channel wall surfaces 53 extend parallel to the X direction or Y direction. Assuming that channel width b is maintained constant, the laser beams 40 will be more poorly homogenized over portions extending only in X direction than over portions extending only in Y direction because of the different divergence angles in X direction and Y direction. A better homogenization is achieved in the portions of the reflection channel 51 oriented in Y direction than in the portions oriented in X direction because of a higher proportion of multiply reflected laser beams 40. This difference could be compensated by suitably adapting the width of the reflection channel 51, but this would result in different weld widths at different places. However, the channel width b and therefore the weld width are primarily oriented to the requirements of the workpiece 20. For this reason, the laser beam source 30 in this embodiment example is aligned in such a way that its radiating direction extends at an incident angle so as to be tilted around the X axis relative to the Z axis. Accordingly, a smaller proportion of the laser beams 40 of the fast axis which are provided with the smaller divergence angle reaches the surface of the workpiece 20 by a direct path. Further, the quantity of reflections at the channel wall surfaces 53 increases due to an increased angle of incidence.

Depending on the path of the weld, the laser beam source 30 can be arranged so as to be tilted around the X axis and/or Y axis relative to the Z axis or can also be arranged during working, a tilt device connected to the control-and-storage unit 7 being provided for this purpose.

To maintain a constant weld position on the workpiece 20, receptacle 1 and homogenizer 50 have a fixed positional relationship relative to one another in X and Y direction. This can be implemented, for example, by position-securing means such as column guide frames, slide rails, or the like, to which the receptacle 1 and homogenizer 50 are fastened.

Figure 2:
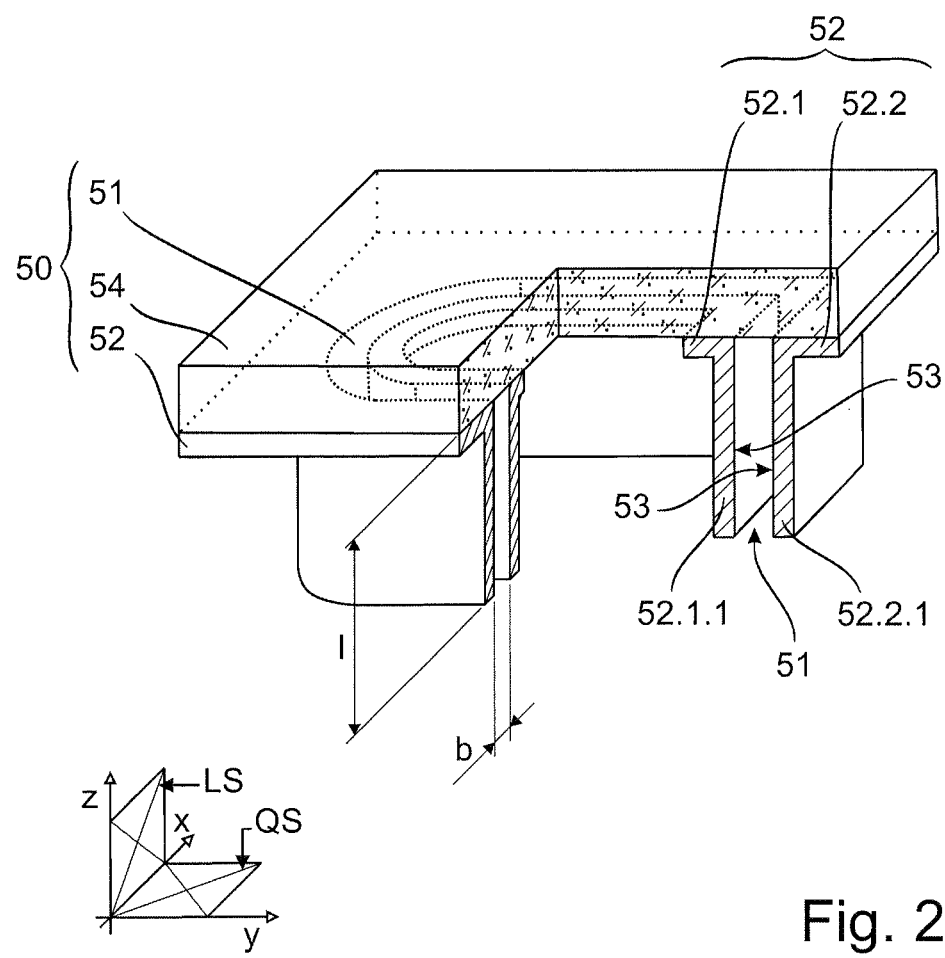
FIG. 2 a first embodiment example for a construction of the homogenizer.

Homogenizer 50 is shown in more detail in FIG. 2.

The carrier 52 comprises two elements 52.1, 52.2 which collectively enclose an intermediate space through which the reflection channel 51 is formed. To produce a weld seam which is free of interruptions and to achieve a fixation of the elements of the carrier 52.1, 52.2 that are separated from one another by the reflection channel 51, there is provided a mechanically stable connection plate 54 which is transparent to the laser beams 40 and which is constructed in this case as a glass plate. In a particularly advantageous manner, the elements of the carrier 52.1, 52.2 are fastened to the side of the connection plate 54 facing the workpiece 20 by gluing. The homogenizer 50 can accordingly be realized very quickly without a high expenditure on assembly. To provide a sufficiently large gluing surface, plane surfaces are formed at the elements of the carrier 52.1, 52.2 on a side facing the connection plate 54. To form the reflection channel 51 with a channel length l, sleeve-shaped thin walls 52.1.1, 52.2.1 are formed at the elements of the carrier 52.1, 52.2.

The carrier 52 can also be formed as a solid plane plate with a thickness equal to the channel length l, although this leads to an unnecessarily high consumption of material and unnecessarily large weight.

A homogenization of the laser beams 40 in the homogenizer 50 is carried out by blending the laser beams 40 through multiple reflection in the reflection channel 51 at the channel wall surfaces 53. In order for blending to take place through multiple reflection, the reflection channel 51 must have a certain size ratio between channel length l and channel width b and at least a portion of the laser beam 40 must impinge at a determined angle in the reflection channel 51.

The size ratio is selected as a function of the width of the weld to be generated. In the embodiment example presently described, the reflection channel 51 has a length of at least 70 mm and a width of at least 10 mm, for example.

The end faces of the walls of the carrier 52.1.1, 52.2.1 opposite the workpiece 20 are constructed in such a way that they can contact the surface of the transmissive workpiece part 21 so that they sharply limit the width of the weld.

Further, the walls of the carrier 52.1.1, 52.2.1 can be used to apply a pressing force to the two workpiece parts 21 and 22 which acts via receptacle 1 or homogenizer 50 during the welding process in that they contact the surface of the transmissive workpiece 21 under pressure.

The end faces can also be arranged at a short distance from the workpiece 20, but as distance 2 increases the edges of the weld lose their sharpness, i.e., in this case, the laser beam 40 impinges with a beam power that decreases toward the edges. When workpieces 20 are curved in Z direction, the walls of the carrier 52.1.1, 52.2.1 are advantageously constructed with different lengths depending on location so that the channel length l varies. The difference in length between the largest length and smallest length may only be so great that at a longest channel length l the beam power impinging on the workpiece 20 is still sufficient to form a melt and at the smallest channel length l a sufficiently good homogenization can still take place.

At least one of the laser beams 40 entering the reflection channel 51 in Z direction from the divergent laser beam source 30 which is angled in Y direction impinge on the channel wall surfaces 53 and are reflected at the latter. The quantity of reflections increases as the angle of incidence of the laser beams 40 increases, so that the portion of the laser beams 40 with the higher divergence is reflected back and forth multiple times between the channel wall surfaces 53 before reaching the surface of the workpiece 20. A homogenized power density distribution in the weld is achieved in a very simple manner without the use of complicated optics when portions of the laser beams 40 which impinge directly on the workpiece 20 are blended with the portions reflected at the channel wall surfaces 55.

A weld which is produced in this way has a very homogeneous fusing of the two workpiece parts 21 and 22 over its entire width. Accordingly, the strength of the weld in the edge areas thereof can also be kept at the same level as in the center of the weld. Further, damage to the surfaces of the workpiece parts 21 and 22 due to inhomogeneities in the power density distribution of the laser beams 40 is virtually excluded. Since the welding process can be carried out in one movement of the transporting device 6, there is an enormous time advantage particularly when working large-area workpieces 20 compared to an apparatus in which an individual laser beam emitter 31 is moved over the weld in series.

Further, as a result of the homogenization the apparatus is not sensitive to fluctuations in distance 2 occurring, e.g., in workpieces 20 which extend chiefly in X and Y direction and which additionally have a difference in height in Z direction along their X-Y extension. Accordingly, there is no need to readjust the distance 2 to conform to the height differences of the workpiece 20 along the weld.

It is advantageous with respect to energy when the individual laser beam emitters 31 of the laser source 30 are switched on by the storage-and-control unit 7 only when they are located over a reflection channel 51 during the forward feed movement with the transporting device 6.

When HLDL modules are used as individual laser beam emitters 31, it is advantageous when two laser beam emitters 31 each are connected to a laser power supply 8 and operated by it. This means that regardless of whether or not one of the two laser beam emitters 31 is located precisely over a reflection channel 51, the second of the laser beam emitters 31 operated by the corresponding laser power supply 8 is also switched at the same time. In order to prevent an emission of the second laser beam emitter 31 which is not needed in this case, at least one water-cooled solid state relay is connected in parallel with each of the two laser beam emitters 31 operated by a power supply so that a laser beam emitter 31 that is not required at the time can be short-circuited when one of the laser power supplies 8 is actuated. In contrast to a solution with shutters arranged in the beam path, this configuration can reduce the average load on the laser beam emitters 31, economize on cooling and decrease the average energy consumption.

Figure 3:
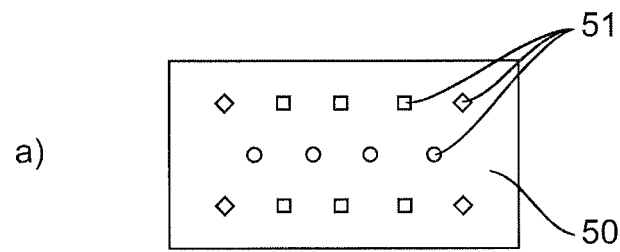
FIG. 3 an illustration showing different embodiments of the reflection channels.
Figure 3:
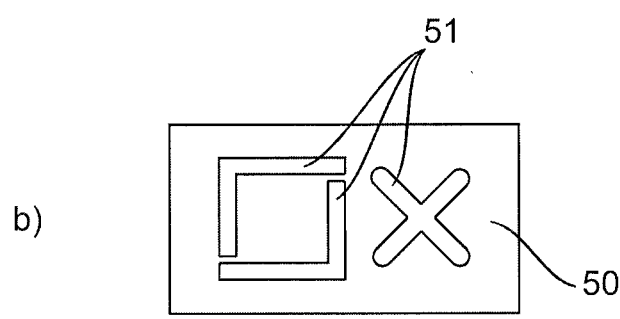
Figure 3:
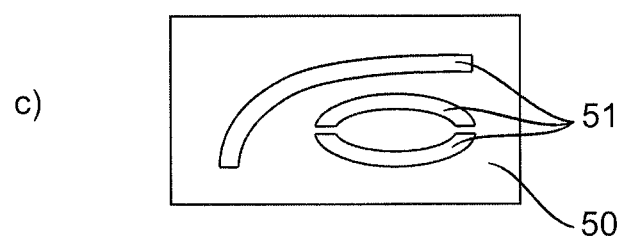
Figure 3:
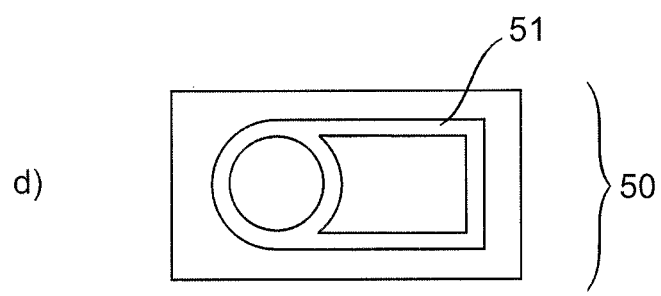

As is shown in selected examples in FIG. 3, reflection channels 51 can be incorporated in the homogenizer 50 in a variety of arrangements and channel cross sections QS in order to generate corresponding welds. The reflection channels 51 shown in FIG. 3*a* are of a special type, namely reflection channels 51 having an extended punctate channel cross section QS which are known in the prior art as beam pipes. They can have an outer contour of any shape with a maximum extension on the magnitude of the permissible aspect ratio. Weld spots in a pattern identical to the arrangement of the beam pipes can be generated in this way, but not weld seams. The advantages of the apparatus according to the invention are only partially realized in this case, although this does not exclude use of the apparatus.

The apparatus can also be used to generate a line-shaped weld whose course is defined in the X direction or Y direction only. The advantages of the apparatus according to the invention are not fully realized in this case either.

FIGS. 3*b* and 3*c* show examples of reflection channels 51 with a straight-line or curvilinear channel cross section QS. It is to be noted here that the linear shape of the reflection channels 51 is not a closed linear shape; thus there remain at least web-shaped material connections so that the carrier 52 is made up of only one plate-shaped element as is also the case in the example in FIG. 3*a*. A transparent connection plate 54 is not necessary in these cases. Depending on the extension, channel cross section QS and quantity of incorporated reflection channels 51, openings can be provided in the carrier 52 in the intermediate spaces between the reflection channels 51, which economizes on weight.

As was already described with reference to the first embodiment example, the channel cross section QS of the reflection channel 51 in FIG. 3*d* is a self-enclosed line so that the reflection channel 51 is formed annularly. It is to be noted in this case that the carrier 52 comprises at least two elements 52.1, 52.2 which are separated from one another. In this case, the use of a connection plate 54 is compulsory for the alignment and fixation of the elements 52.1, 52.2.

A particularly advantageous application of this apparatus is afforded when the transmissive workpiece part 21 is formed of a thin-walled, flat material, for example, a foil, and the absorptive workpiece part 22 has a cup-shaped construction with thin-walled wall structures which stand upright in Z direction and on which the foil is to be welded. In a commonly used method for welding workpiece parts of this kind, a heated plate which entirely covers the workpiece 20 is pressed on the upper workpiece part 21 resulting in a fusing between the two workpiece parts 21 and 22 due to the pressing force and the introduction of heat from the heated plate. The thin-walled wall structures of the workpiece part 22 must be sufficiently stable to allow them to absorb the pressing force of the heated plate. The stability required for this can be achieved exclusively by the thickness of the wall structures.

By using the apparatus according to the invention, the thickness of the wall structures can be reduced to a minimum because the wall structures need no longer withstand the counterpressure of the heated plate. Instead, the workpiece part 21 is held by its edges under pre-loading in X direction and Y direction prior to welding and is clamped with a slight pressing pressure over the cup-shaped workpiece part 22 so that the workpiece parts 21, 22 contact one another. The welding process is then carried out. In spite of the fact that the very thin-walled wall structures of the workpiece part 22 only have very small surfaces for producing the weld, a strength of the weld connection comparable to that achieved by the heating plate can be achieved by homogenization. This economizes on material and, further, increases the efficiency of workpieces 20 requiring the thinnest possible wall structure for functionality.

In another embodiment example, a longitudinal section LS does not present two channel wall surfaces (FIG. 2) arranged parallel to one another as in the previous embodiment examples; rather the channel wall surfaces 53 converge, i.e., they are arranged so as to be tilted at an angle to the Z direction so that the opening of the reflection channel 51 facing the laser beam source 30 is larger than that facing the workpiece 20. In this way, the quantity of reflections can be increased on the one hand and the opening of the channel on the workpiece side can be reduced on the other hand in order to produce a narrower weld. Accordingly, depending on the channel length l and channel width b, limits are imposed on the size of the angle such that the reflections may not lead to the laser beam 40 being reflected back.

In another special construction, the laser beam source 30 is aligned in such a way that its radiating direction also extends in direction of the slow axis at an angle of inclination to the Z axis. In this case, the radiating direction encloses an angle of inclination with the channel wall surfaces 53 oriented in Y direction. This can be achieved in that individual, or all individual, laser beam emitters 31 of the laser beam source 30 are tilted at the Y axis relative to the Z axis by an angle of inclination. Accordingly, a further improvement in homogenization can also be achieved in portions of a reflection channel 51 with annular channel cross section QS which extend in the Y direction. Every tilting of the laser beam emitters 31 out of a position aligned perpendicular to the homogenizer 50 simultaneously reduces the laser beams 40 reflected back by the homogenizer 50 and, therefore, reduces the thermal load and expenditure on cooling of the laser beam source 30.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS

1 receptacle
2 distance
20 workpiece
21 transmissive workpiece part
22 absorptive workpiece part
30 laser beam source
31 laser beam emitter
40 laser beams
41 effective region
50 homogenizer
51 reflection channel
52 carrier
52.1, 52.2 element of the carrier
52.1.1, 52.2.1 wall of the carrier
53 channel wall surface
54 connection plate
6 transporting device
7 storage-and-control unit
8 laser power supply
b channel width
l channel length
QS channel cross section
LS longitudinal section

What is claimed is:

1. Apparatus for joining two workpiece parts to form a workpiece along a weld extending in at least two dimensions by transmission welding, having a receptacle which is dimensioned such that two workpiece parts extending in a planar manner in X and Y direction are positioned relative to one another in the X direction, Y direction and Z direction of a Cartesian coordinate system, having a laser beam source which is aligned in the radiating direction thereof on the receptacle and, therefore, on workpiece parts positioned therein, which laser beam source comprises a plurality of individually controllable laser beam emitters which collectively form a line array which is oriented in X direction, having a transporting device for transporting the laser beam source relative to the receptacle in Y direction, and having a storage-and-control unit for spatially resolved operation of the laser beam emitters depending on the position of the receptacle in Y direction, and further comprising a homogenizer arranged downstream of the laser beam source in the radiating direction, which homogenizer has a carrier in which is provided at least one reflection channel with a channel cross section which is adapted to the course of the weld and a channel width which is adapted to the width of the weld and a channel length in Z direction, and in that the reflection channel has oppositely located reflecting channel wall surfaces at which at least a portion of at least one laser beam coming from the laser beam source is repeatedly reflected back and forth.

2. Apparatus according to claim 1, wherein said channel cross section of the reflection channel has an annular closed structure, and the channel wall surfaces are formed by at least two elements of the carrier.

3. Apparatus according to claim 1, further comprising a stable transparent connection plate provided for the elements of the carrier, said elements of the carrier being fastened thereto.

4. Apparatus according to claim 3, wherein said elements of the carrier are glued to the connection plate.

5. Apparatus according to claim 1, wherein the channel wall surfaces are arranged in parallel facing relation to one another.

6. Apparatus according to claim 1, wherein the channel wall surfaces are arranged so as to converge.

7. Apparatus according to claim 1, wherein the laser beam source is oriented in such a way that the radiating direction encloses an angle with the channel wall surfaces.

8. Apparatus according to claim 2, wherein said elements of the carrier have sleeve-shaped walls which collectively form the at least one reflection channel having a channel length.

9. Apparatus according to claim 8, wherein said sleeve-shaped walls have end faces which face the receptacle and which can be brought into contact with a workpiece positioned in the receptacle.

10. Apparatus according to claim 8, wherein said sleeve-shaped walls of the carrier are constructed with a channel length which varies in a location-dependent manner to allow the homogenizer to be adapted to an irregular workpiece.

* * * * *